(12) United States Patent
Reynolds

(10) Patent No.: US 7,550,532 B2
(45) Date of Patent: Jun. 23, 2009

(54) POLYESTER RESIN COMPOSITION

(75) Inventor: Jeffrey Andrew Reynolds, Cincinnati, OH (US)

(73) Assignee: Illinois Tool Works Inc., Glenview, IL (US)

( * ) Notice: Subject to any disclaimer, the term of this patent is extended or adjusted under 35 U.S.C. 154(b) by 652 days.

(21) Appl. No.: 11/178,652

(22) Filed: Jul. 11, 2005

(65) Prior Publication Data

US 2007/0010608 A1 Jan. 11, 2007

(51) Int. Cl.
*C08L 67/02* (2006.01)

(52) U.S. Cl. .............................. 525/27; 525/44; 525/48

(58) Field of Classification Search .................. 525/27, 525/44, 48
See application file for complete search history.

(56) References Cited

U.S. PATENT DOCUMENTS

| | | |
|---|---|---|
| 3,051,679 A * | 8/1962 | Forsyth .................. 427/389.8 |
| 4,071,489 A | 1/1978 | Emmons et al. |
| 4,263,198 A | 4/1981 | Feldman et al. |
| 4,310,644 A | 1/1982 | Miley |
| 4,600,738 A * | 7/1986 | Lamm et al. ................. 523/500 |
| 4,867,989 A | 9/1989 | Silva et al. |
| 5,880,181 A | 3/1999 | Torenbeek et al. |
| 6,821,569 B2 | 11/2004 | Okada et al. |
| 2007/0010609 A1 | 1/2007 | Reynolds |
| 2007/0265385 A1 | 11/2007 | Reynolds |

FOREIGN PATENT DOCUMENTS

| | | |
|---|---|---|
| GB | 729 780 A | 5/1955 |
| WO | WO02/088249 A2 | 11/2002 |

* cited by examiner

*Primary Examiner*—Bernard Lipman
(74) *Attorney, Agent, or Firm*—Dinsmore & Shohl LLP

(57) ABSTRACT

A hardener composition useful in a two part resin system. The hardener composition includes a reactive carrier, and a peroxide catalyst. The hardener composition can have a shelf life of over six months. A two-part polyester resin system and a method of making a polyester resin composition are also disclosed.

23 Claims, No Drawings

POLYESTER RESIN COMPOSITION

FIELD OF THE INVENTION

The present invention relates to polyester resins and their use in primers, body fillers, adhesives, and putties that are used in surface repairs and surface finishing for metal and plastic substrates for equipment and vehicles such as automotive, marine, agricultural and airborne vehicles, and industrial equipment.

BACKGROUND OF THE INVENTION

Traditionally, the polyester repair markets have utilized well-defined processes in the area of damage repair. Unsaturated polyester resins, primers, fillers, adhesives, or putties are used to resurface and reshape damaged areas. For ease of understanding, the term "resin" will be used in the following description; however, it is to be understood that the term includes cured resins and prepolymers (uncured resins), primers, fillers, adhesives, and putties. The method for catalyzation and application of the resin is as much an art as it is a science. This is due in part to the very small amount of peroxide hardener (catalyst) that is used to cure the much larger amounts of unsaturated polyester resin properly. The optimum peroxide level needed to cure the resin is generally about 1 to 3 parts per hundred of the resin by weight. The resin and peroxide are packaged in separate containers, typically a large can for the filler (8 oz. to 55 gal.), and a small tube for the peroxide catalyst (0.25 oz. to 4 oz.).

The user dispenses a variable amount of resin into a cup or onto a mixing board, and adds the peroxide catalyst, essentially guessing at the correct amount for proper catalyzation. The consequences of improper catalyzation of the resin include loss of adhesion to the substrate, uncured surface (tacky), cracking of the resin due to excessive heat generation, migration of uncured resin organics to subsequent coatings resulting in discoloration of top coats, outgassing of uncured material in the presence of ultraviolet or heat energy from sunlight or paint baking systems resulting in blistering and other damage to the topcoat, as well as other problems that may require removal and replacement of the repair.

It has been difficult to create of a peroxide catalyst with a more reasonable mix ratio to the unsaturated polyester resins. The standard benzoyl and ketone peroxides use plasticizers such as phthalates as carriers. Phthalates are non-reactive and represent up to about 50% of the peroxide catalysts in commercial se. The non-reactive nature of the carrier does not adversely affect performance of the cure at levels of 1.5 to 3 parts per hundred unsaturated resin, but levels above 5 parts per hundred can disrupt the cure.

There remains a need in the art for a polyester resin composition that provides a more equal mix ratio between the resin and catalyst components.

SUMMARY OF THE INVENTION

The present invention meets this need by providing a hardener composition useful in a two-part resin system. The hardener composition includes a reactive carrier, and a peroxide catalyst. Preferably, the hardener composition has a shelf life of over six months.

Another aspect of the invention is a two-part polyester resin system. The two-part polyester resin composition includes: a hardener composition including a reactive carrier and a peroxide catalyst; and a resin composition including a reactive polymer, a reactive monomer, or combinations thereof. Again, preferably the hardener composition has a shelf life of over six months.

Another aspect of the invention is a method of making a polyester resin composition. The method includes: providing a hardener composition including: a reactive carrier and a peroxide catalyst; providing a resin composition including: a reactive polymer, a reactive monomer, or combinations thereof, wherein a ratio of a volume of the hardener composition to a volume of the resin composition is about 1:10 to about 1:1; and mixing the hardener composition and the resin composition in the volume ratio of about 1:10 to about 1:1 to form the polyester resin composition.

DETAILED DESCRIPTION OF THE INVENTION

The present invention involves a polyester primer, resin, filler, adhesive, or putty that can be applied to metal substrates, such as cold rolled steel, galvanized steel, and aluminum, as well as to plastic substrates, such as polyesters, polyurethanes, polyolefins, sheet molding compounds (SMC), and bulk molding compounds (BMC).

The goal was to identify a carrier for the catalyst which will not react with the catalyst, and which can be stabilized in the presence of peroxides, and which will be a reactive component in the system by effectively crosslinking with the unsaturated polyester, maintaining an integral cure. The ideal solution to the carrier problem would be a material that is already part of the unsaturated polyester system. The material should be of a reasonable viscosity so as to be practical for dispensing and mixing. In addition, it should be stable in the presence of peroxides for long periods, such as more than six months, or more than one year, or longer.

The present invention involves the use of a reactive carrier, rather than a non-reactive carrier, such as phthalate plasticizers. The use of a reactive carrier greatly increases the challenge of stabilization of the blend. It will be a reactive component in the system, but it can be stabilized in the presence of the catalyst alone. Preferably, the reactive carrier is an non-diluted low viscosity unsaturated polyester resin. The unsaturated polyester should have a sufficiently low molecular weight that the viscosity is practical in the absence of a reactive diluent. Generally, the viscosity is less than about 10,000 cps. Most unsaturated polyesters are solids at room temperature in a non-diluted state. However, unsaturated polyesters designed for pigment dispersion have very low molecular weight. Examples include non-diluted, low viscosity maleate-based or fumarate-based unsaturated polyesters. They can be stabilized effectively in the presence of ketone and benzoyl peroxides for the desired shelf life. When combined with the resins that are sufficiently thinned with reactive diluent, they provide an integral cure with a catalyst dispersion level up to about 100 parts per hundred resin or filler by weight.

The ability to measure the mix ratio of catalyst to resin accurately will reduce or eliminate the most common problems associated with unsaturated polyester repair product use, and will increase the value of the product to the user.

The invention involves the use of peroxide catalysts dispersed in a reactive carrier, such as non-diluted low molecular weight unsaturated polyesters, to be used as the hardener side for a two-part resin system.

Suitable non-diluted unsaturated polyesters include, but are not limited to, short chain unsaturated aliphatic dicarboxylic acid based polyesters. Suitable short chain unsaturated aliphatic dicarboxylic acid based polyesters include, but are not limited to, maleates and fumarates with a viscosity in the range of about 100 to about 10,000 cps, generally about 100 to about 2,000.

Suitable peroxide catalysts include, but are not limited to, ketone peroxides, cumyl hydroperoxides, dibenzoyl peroxides, peroxyesters, peroxyketals, and peroxydicarbonates. Suitable ketone peroxides include, but are not limited to, methyl ethyl ketone peroxide, 2,4-pentadione peroxide, methyl isobutyl ketone peroxide, acetyl acetone peroxide, cyclohexanone peroxide.

The hardener side can also include fillers such as talcs, carbonates, pigments, rheological modifiers, microspheres, pigment wetting and dispersing agents, parrafins, and fiber reinforcements.

The resin side of the system can include a reactive polymer, or a monomer, or a combination of the two. Suitable reactive polymers include, but are not limited to, unsaturated polyesters, vinyl esters, and hybrid epoxy-polyester and acrylate-polyester systems that polymerize by way of a free radical mechanism. Suitable monomers include, but are not limited to, styrene, vinyl toluene, other methyl styrene monomers, methyl methacrylate, and other acrylate monomers.

The resin side can also include fillers such as talcs, carbonates, pigments, rheological modifiers, microspheres, pigment wetting and dispersing agents, paraffins, and fiber reinforcements.

The fillers can be included in the hardener side and the resin side so that the volume of the two compositions are approximately the same. The ratio of the volume of the hardener side to the volume of the resin side is generally about 1:10 to about 1:1, typically about 1:10 to about 1:2. With the volume ratio in this range, it is much easier to provide correct amount of hardener for the amount of resin used, eliminating the guesswork of prior art systems.

Controlling the volume of each side will allow the use of a mixing tube applicator, for example a double barrel mixing tube. The double barrel mixing tube applicator has the hardener composition on one side and the resin composition on the other side. The plunger dispenses the hardener composition and resin composition in the proper amounts so that they can be mixed and applied.

In order that the invention may be more readily understood, reference is made to the following examples which are intended to illustrate the invention, but not limit the scope thereof.

EXAMPLE 1

The hardener (peroxide dispersion) side of the system was prepared using different reactive carriers: 1—short chain dipropylene glycol (DPG) maleate that is non-diluted with monomer; 2—dipentaerythritol pentacrylate monomer; and 3—diglycidil ether bisphenol A.

Two methyl ethyl ketone peroxide solutions with 9% active oxygen (1 and 2) were used, as well as a 50% benzoyl peroxide paste (3).

An antioxidant, 2,6-di-tertiary-butyl-n,n-dimethylamino-para-cresol (1), was also tested.

The use of an acrylate monomer (Formulations C and D) broke down the stability of the mixture with both benzoyl peroxide and methyl ethyl ketone peroxides. The ketone peroxide was stable in the low viscosity undiluted unsaturated polyester for a shelf life in excess of 3 years in absence of additional antioxidents or stabilizers.

EXAMPLE 2

A study was run to determine the stability of benzoyl peroxide in short chain DPG maleate that is non-diluted with monomer (reactive carrier 1). An additional antioxidant, 2,6-di-tertiary-butyl-para-cresol (BHT) (2) was also tested.

| Raw Material | A | B | C | D |
| --- | --- | --- | --- | --- |
| Reactive Carrier 1 | 90.0 | 90.0 | 90.0 | 90.0 |
| Peroxide 3 | 10.0 | 10.0 | 10.0 | 10.0 |
| Antioxidant 2 | $1.7 * 10^{-3}$ | | $1.7 * 10^{-3}$ | |
| Antioxidant 1 | | $1.5 * 10^{-3}$ | $1.5 * 10^{-3}$ | |
| Total | 100 | 100 | 100 | 100 |
| Shelf Stability | 96 days | 69 days | >240 days | 62 days |

Samples maintained at ambient temperature.
All values representative of percentage by weight.

As expected, the control (Formulation D) had the least stability, with increased stability as antioxidants were added. The combination of the two antioxidants (Formulation C) showed excellent results. Based on this test, it was likely that the benzoyl peroxide system could be successfully stabilized for periods approaching 1 year and likely longer.

EXAMPLE 3

This test was designed to test the effect of soda lime borosilicate microspheres as a filler on the hardener composition. The use of glass microspheres allowed large volumetric increases to the hardener composition in relation to the resin composition of the two-part system.

| Raw Material | A | B | C | D | E | F |
| --- | --- | --- | --- | --- | --- | --- |
| Reactive Carrier 1 | 85.7 | 79.0 | | | 62.8 | 62.7 |
| Reactive Carrier 2 | | | 53.2 | 53.2 | | |
| Reactive Carrier 3 | | | 18.8 | 18.8 | 14.8 | 14.8 |
| Peroxide 1 | 14.3 | 21.0 | | | 22.4 | 22.4 |
| Peroxide 2 | | | | 28.0 | | |
| Peroxide 3 | | | 28.0 | | | |
| Antioxidant 1 | | | | | | 0.02 |
| Total | 100 | 100 | 100 | 100 | 100 | 100 |
| Shelf Stability | >1200 days | >1200 days | 7 days | 20 days | >1200 days | >1200 days |

Samples maintained at ambient temperature.
All values representative of percentage by weight.

| Raw Material | A | B | C | D | E | F |
|---|---|---|---|---|---|---|
| Reactive Carrier 1 | 73.7 | 66.6 | 66.6 | 66.6 | 66.6 | 66.6 |
| Microspheres | 15.8 | 16.7 | 16.7 | 16.7 | 16.7 | 16.7 |
| Catalyst 3 | 10.5 | 16.7 | 16.7 | 16.7 | 16.7 | 16.7 |
| 1,4 NQ Soln | | | | $1.5 * 10^{-3}$ | $1.5 * 10^{-3}$ | |
| Antioxidant 2 | | | $2.5 * 10^{-3}$ | $2.5 * 10^{-3}$ | $5.0 * 10^{-3}$ | $5.0 * 10^{-3}$ |
| Antioxidant 1 | | | $1.5 * 10^{-3}$ | $1.5 * 10^{-3}$ | $1.5 * 10^{-3}$ | $1.5 * 10^{-3}$ |
| Total | 100 | 100 | 100 | 100 | 100 | 100 |
| Shelf Stability | >90 days | >90 days | >90 days | >90 days | >90 days | >90 days |

Samples maintained at ambient temperature.
All values representative of percentage by weight.

The results showed that the peroxide could be stabilized in the non-diluted low viscosity unsaturated polyester resin in the presence of fillers such as microspheres.

EXAMPLE 4

Typical sample formulations for different mix ratios are shown.

| | 1:10 | 1:4 | 1:2 | 1:1 |
|---|---|---|---|---|
| Resin Composition | | | | |
| Styrenated Unsaturated Polyester Resin | 43.74 | 35.23 | 28.28 | 24.33 |
| Monomer | 8.75 | 12.92 | 16.06 | 17.92 |
| Wax | 0.07 | 0.07 | 0.07 | 0.07 |
| Tetrahydrophthalic acid | 1.94 | 1.88 | 1.81 | 1.77 |
| $TiO_2$ | 2.43 | 2.35 | 2.26 | 2.21 |
| Rheological Modifier | 0.49 | 0.47 | 0.45 | 0.44 |
| Microtalc | 13.37 | 12.92 | 12.44 | 12.16 |
| Calcium Carbonate | 12.15 | 11.75 | 11.34 | 11.06 |
| Microspheres | 8.51 | 5.87 | 4.52 | 1.66 |
| Hardener Composition | | | | |
| Reactive Carrier | 4.86 | 11.74 | 16.97 | 19.91 |
| Microspheres | 1.22 | 2.35 | 3.39 | 6.08 |
| Benzoyl Peroxide (50%) | 2.43 | 2.35 | 2.26 | 2.21 |
| Antioxidant 2 | 0.01 | 0.02 | 0.03 | 0.04 |
| Antioxidant 1 | 0.03 | 0.08 | 0.12 | 0.14 |
| Total | 100.00 | 100.00 | 100.00 | 100.00 |

All values are representative of percent by weight

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A hardener composition useful in a two part resin system consisting essentially of:
   a reactive carrier comprising a non-diluted unsaturated polyester with the proviso that the non-diluted unsaturated polyester does not contain an acrylate;
   a peroxide catalyst; and
   optionally, at least one filler.

2. The hardener composition of claim 1 wherein the hardener composition has a shelf life of over six months.

3. The hardener composition of claim 1, wherein the non-diluted unsaturated polyester comprises a short chain unsaturated aliphatic dicarboxylic acid based polyester.

4. The hardener composition of claim 3, wherein the short chain unsaturated aliphatic dicarboxylic acid based polyester comprises a maleate based polyester or a fumarate based polyester.

5. The hardener composition of claim 4, wherein the maleate based polyester or the fumarate based polyester has a viscosity in a range of from about 100 to about 10,000 cps.

6. The hardener composition of claim 1, wherein the peroxide catalyst is selected from ketone peroxides, cumyl hydroperoxides, dibenzoyl peroxides, peroxyesters, peroxyketals, and peroxydicarbonates.

7. The hardener composition of claim 6, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide.

8. The hardener composition of claim 1, wherein the at least one filler is selected from talcs, carbonates, pigments, rheological modifiers, microspheres, pigment wetting and dispersing agents, paraffins, fiber reinforcements, or combinations thereof.

9. A two-part polyester resin system comprising:
   a hardener composition consisting essentially of:
      a reactive carrier comprising a non-diluted unsaturated polyester with the proviso that the non-diluted unsaturated polyester does not contain an acrylate;
      a peroxide catalyst; and
      optionally, at least one filler; and
   a resin composition comprising:
      a reactive polymer, a reactive monomer, or combinations thereof.

10. The two-part polyester resin system of claim 9 wherein the hardener composition has a shelf life of over six months.

11. The two-part polyester resin system of claim 9, wherein the non-diluted unsaturated polyester comprises a short chain unsaturated aliphatic dicarboxylic acid based polyester.

12. The two-part polyester resin system of claim 11, wherein the short chain unsaturated aliphatic dicarboxylic acid based polyester comprises a maleate-based polyester or a fumarate-based polyester.

13. The two-part polyester resin system of claim 12, wherein the maleate-based polyester or the fumarate-based polyester has a viscosity in a range of from about 100 to about 10,000 cps.

14. The two-part polyester resin system of claim 9, wherein the peroxide catalyst is selected from ketone peroxides, cumyl hydroperoxides, dibenzoyl peroxides, peroxyesters, peroxyketals, and peroxydicarbonates.

15. The two-part polyester resin system of claim 14, wherein the peroxide catalyst is the ketone peroxide selected from methyl ethyl ketone peroxide, 2,4-pentadione peroxide, methyl isobutyl ketone peroxide, acetyl acetone peroxide, cyclohexanone peroxide.

16. The two-part polyester resin system of claim 9, wherein the resin composition further comprises at least one filler.

17. The two-part polyester resin system of claim 16, wherein the at least one filler is selected from talcs, carbonates, pigments, rheological modifiers, microspheres, pigment wetting and dispersing agents, paraffins, fiber reinforcements, or combinations thereof.

18. The two-part polyester resin system of claim 9, wherein the at least one filler is selected from talcs, carbonates, pigments, rheological modifiers, microspheres, pigment wetting and dispersing agents, paraffins, fiber reinforcements, or combinations thereof.

19. The two-part polyester resin system of claim 9, wherein the resin composition comprises the reactive polymer selected from unsaturated polyesters, vinyl esters, hybrid epoxy-polyester systems, hybrid acrylate-polyester systems, and combinations thereof.

20. The two-part polyester resin system of claim 9, wherein the resin composition comprises the reactive monomer selected from styrene, vinyl toluene, methyl styrene monomers, methyl methacrylate, acrylate monomers, or combinations thereof.

21. The two-part polyester resin system of claim 9, wherein a ratio of a volume of the hardener composition to a volume of the resin composition is in a range of about 1:10 to about 1:1.

22. The two-part polyester resin system of claim 21 wherein the ratio is in the range of about 10:1 to about 2:1.

23. A method of making a polyester resin composition comprising:
  providing a hardener composition consisting essentially of:
    a reactive carrier comprising a non-diluted unsaturated polyester with the proviso that the unsaturated polyester does not contain an acrylate;
    a peroxide catalyst; and
    optionally, at least one filler;
  providing a resin composition comprising:
    a reactive polymer, a reactive monomer, or combinations thereof;
  wherein a ratio of a volume of the hardener composition to a volume of the resin composition is about 1:10 to about 1:1; and
  mixing the hardener composition and the resin composition in the volume ratio of about 1:10 to about 1:1 to form the polyester resin composition.

* * * * *